INVENTORS,
RAYMOND E. BIRCH,
DONALD O. McCREIGHT.
BY
Brown, Critchlow, Flick & Peckham
their ATTORNEYS.

INVENTORS.
RAYMOND E. BIRCH,
DONALD O. McCREIGHT.
BY
Brown, Critchlow, Flick & Peckham
their ATTORNEYS.

United States Patent Office

Re. 25,572
Reissued May 12, 1964

25,572

FIRED SILICA REFRACTORIES

Donald O. McCreight, Bethel Park, and Raymond E. Birch, Pittsburgh, Pa., assignors to Harbison-Walker Refractories Company, Pittsburgh, Pa., a corporation of Pennsylvania Original No. 3,024,122, dated Mar. 6, 1962, Ser. No. 91,740, Feb. 27, 1961. Application for reissue Oct. 2, 1962, Ser. No. 228,222
3 Claims. (Cl. 106—58)

Matter enclosed in heavy brackets [ ] appears in the original patent but forms no part of this reissue specification; matter printed in italics indicates the additions made by reissue.

This invention relates to improved silica refractory shapes and brick for use in such applications as by-product coke ovens and the like.

By-product coke ovens are long narrow chambers lined with silica brick and usually joined together in batteries of up to 100 or more ovens. The ovens are separated from each other by silica brick walls which also enclose the heating flues that supply the heat for coking the coal. by this means, the combustion gases from the heating flues and the gaseous products of carbonization are kept separate at all times.

In the operation of coke ovens, the ovens are readied for charging by setting the doors in place. The coal is then charged into the coking chambers and the firing cycle begun. Coking is normally completed in 14 to 18 hours depending on the width of the oven and the temperatures employed. When the coking cycle is completed, the doors are removed and the coke is pushed out of the oven by an electrically driven ram into the quenching car. The quenching car transfers the hot coke to the quenching station where the coke is cooled by spraying with water. After the coke is pushed out of the oven, the doors are replaced and the oven prepared for charging again.

The principal refractory material used in the construction of by-product coke ovens is silica brick. Silica brick has two inherent qualities which recommend them for such service. The more important property is their volume stability at the operating temperatures of the coke oven. The reversible thermal expansion of silica brick is essentially complete below about 1060° F. Thus, the continuing high temperature expansion experienced with other types of refractory brick and which must be allowed for in structures is absent when silica brick form the construction. The other unique property of silica brick is their ability to withstand high loads and to remain rigid up to within a few degrees of their actual melting point of 3140° F. For example, conventional first quality silica brick do not fail in the load test at 25 p.s.i. until a temperature of about 2975° to 3025° F. is reached and superduty silica brick, as exemplified in United States Patent No. 2,351,204, wherein the total of alumina, titania, and alkalies does not exceed 0.5 weight percent, withstand the 25 pound load up to about 3075° or even 3090° F.

In coke oven operation, it will be realized that the highest temperatures are encountered in the coke walls. These walls are also subjected to very rapid changes in temperature when the cold coal is charged into the hot oven. However, experience has shown that even though the wall temperature rarely drops below 1000° F. and, therefore, spalling due to thermal shock is not a serious problem, it is a factor which must be considered. The normal top temperature recorded in the oven walls is about 2800° F. so the strength of the silica is not jeopardized.

The walls of the coke oven are subjected to severe abrasive action during charging and when the coke is pushed out into the quenching car. The oven chamber has even been tapered to reduce the abrasive action against the wall as much as possible during pushing. Therefore, the ability of the wall brick to effectively resist the abrasive effects of the coke bears a direct relation to the life of a coke oven battery.

As explained above, the heat for coking is supplied from flues which are enclosed within the silica walls. Thus, the thermal conductivity of the wall material is an important factor in providing for the transfer of heat from these flues to the coke. It can easily be understood that a material possessing a high thermal conductivity would enable a more economical operation of the coke oven than one of a lower conductivity.

It is therefore, a major object of the invention to provide silica brick with increased spalling resistance, increased resistance to abrasion and a higher thermal conductivity than is presently experienced as well as to provide improved articles such as coke oven walls and the like constructed of the brick.

In the attached drawing.

Figure 1:
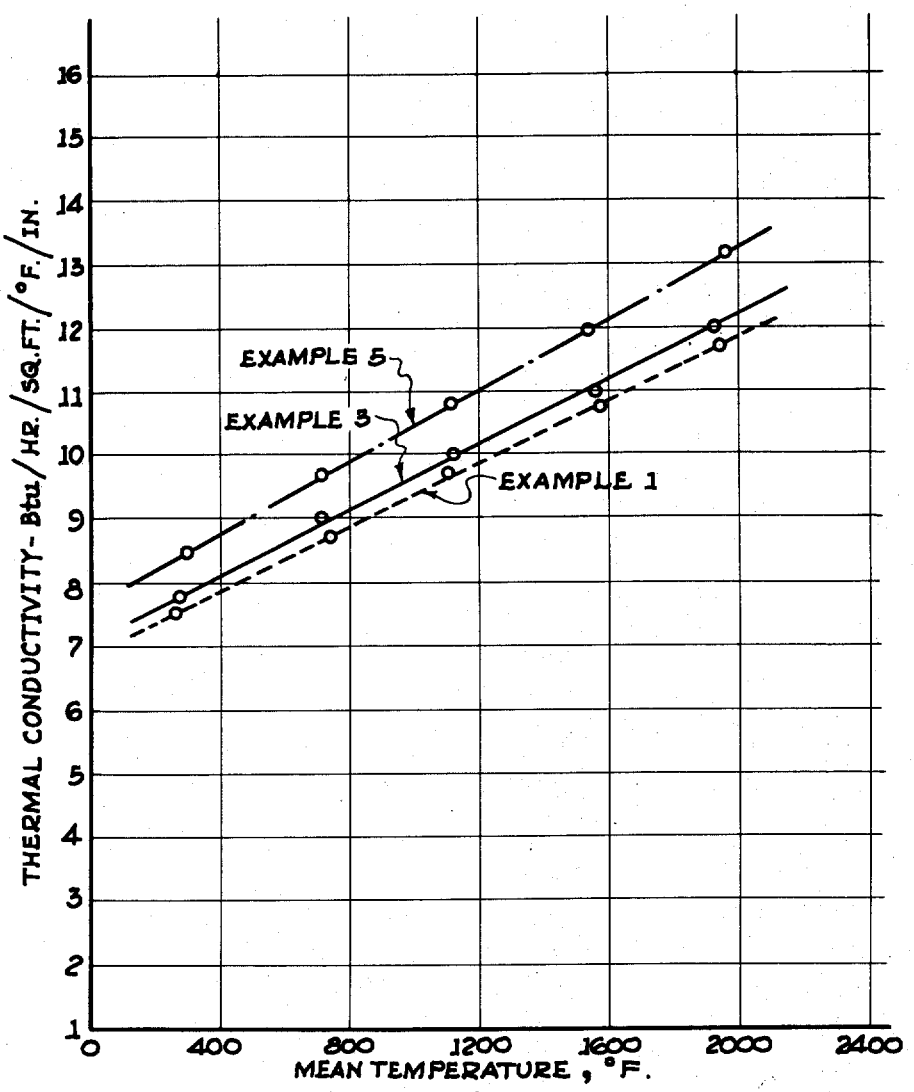
FIG. 1 shows thermal conductivity data on superduty silica refractories.
Figure 2:
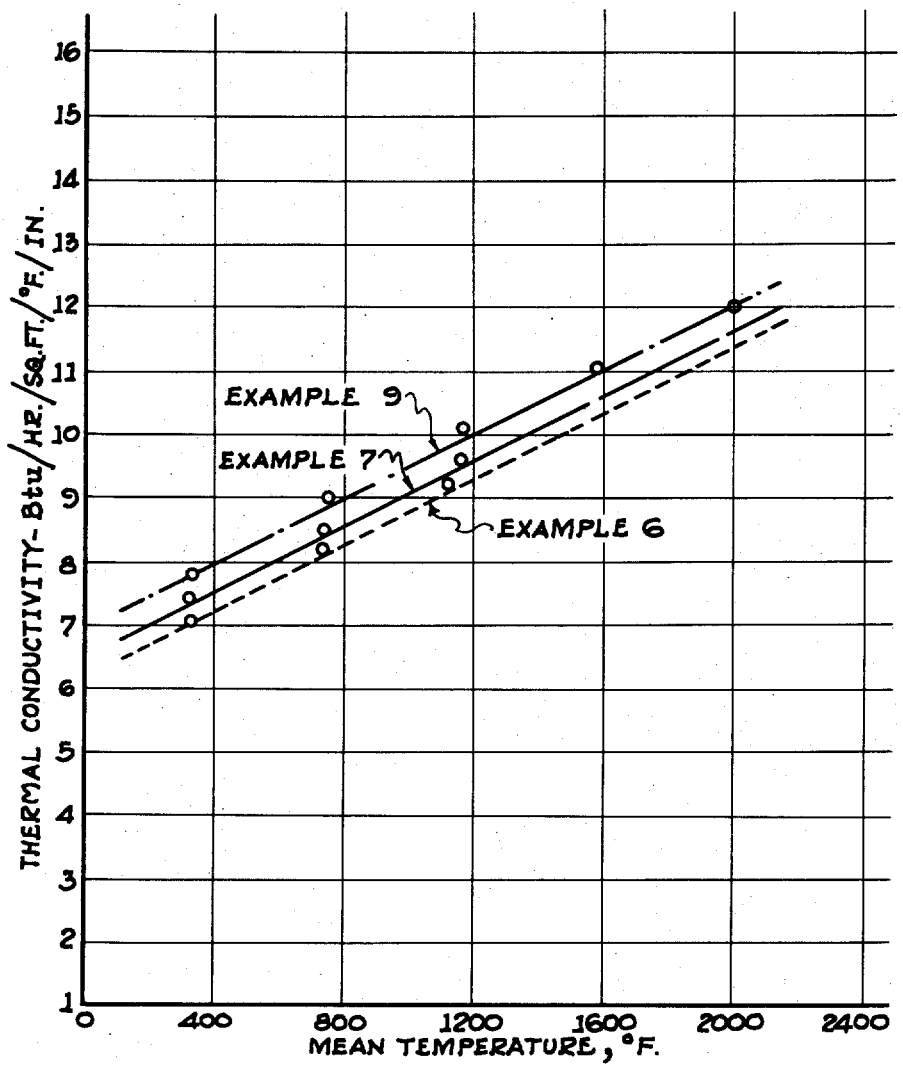
FIG. 2 shows thermal conductivity data on regular type silica refractories.

In each of FIGS. 1 and 2 data are presented on products of the invention as well as prior art products, for comparison purposes.

These and other objects are attained in accordance with our invention in which about 1 to 5 weight percent of copper oxide, based on the solids content of the resulting batch, is included in a silica refractory batch. Silica brick produced therefrom, and otherwise made in accordance with standard practices, are characterized by increased spalling and abrasion resistance as well as a higher thermal conductivity than in silica refractories produced heretofore.

The silica refractories with which the invention is concerned are formed from a batch composed, by weight, of 1 to 5 percent total of at least one member of the group consisting of calcium oxide and magnesium oxide, 1 to 5 percent of copper oxide, and the remainder silica rock or quartzite. For superduty type brick, chemical analysis of the batch will show not over 0.5 percent total of alumina ($Al_2O_3$), titania ($TiO_2$), and alkalies $$(Na_2O+K_2O)$$

For conventional silica brick, those materials may range, in the aggregate, up to about 0.8 to 1.5 percent. The composition is further characterized, in the instance of superduty quality, in that chemical analysis will show that the one or more members of the group of calcium and magnesium oxides are present in a total amount of at least 3.3 times the content of alumina, titania and alkalies. The lime (CaO) and magnesia contents are supplied by that added as bond, usually the commercial hydrates.

The silica rock or quartzite used in the compositions may be any one of the types commonly used in making silica brick, with the purity level being determined by whether regular or superduty brick are to be made. As mined, the silica mineral may consist of quartzite in massive form or as agglomerated quartzite pebbles. Other forms of silica rock used for silica brick manufacture are also suitable.

Copper oxide used in the invention can be cupric oxide (CuO) or cuprous oxide ($Cu_2O$) or mixtures thereof. Generally, the oxide is finely divided sufficiently to pass a 100 Tyler mesh screen or be even finer. It is incorporated in the batch in any manner that brings about a fine dispersion of the copper oxide throughout the other components. About 1 to 5 percent, based on the resulting batch, of the copper oxide, is used with about 3 to 5 percent constituting the preferred range.

The lime used for bonding will ordinarily be commercial hydrated lime. Dolomitic lime ($CaO \cdot MgO$) is also usable and will likewise ordinarily be used as the hydrate. When magnesia ($MgO$) is used alone, it will be preferable to use the light burned magnesia (caustic magnesia) which is readily hydratable. There is nothing in these practices which is not well known in the art of silica brick manufacture. The lime or magnesia added to the batch in these forms is spoken of as the bond, since it is available both as a bond in the fired brick and also for giving strength to the unfired brick. In silica brick manufacture, lime is commonly used in amounts of 1 to 5 percent (on the basis of $CaO$), and magnesia which has similar properties is less commonly used.

Silica brick of the invention are usually made by the power press, impact press, or hand molding process in accordance with standard techniques developed in the production of superduty silica refractories. In the following examples, the standard power press method of making silica brick was employed. The components were crushed and thoroughly blended together to give a typical brickmaking grind, as follows:

| | Percent |
|---|---|
| −6+10 Tyler mesh | 10 |
| −10+28 | 30 |
| −28+65 | 16 |
| −65 | 44 |

About 5 percent by weight of water was added as was about one percent of concentrated waste sulfite liquor, a temporary bonding agent. The batch was then pressed into brick, measuring 9 x 4½ x 3 inches, at about 4000 p.s.i. The brick were removed from the press and dried for about 24 hours at 250° F. The brick were then fired in a tunnel kiln for five days, reaching a top temperature of 2700° F.

In these examples, the normal superduty silica brick mix of a very low impurity quartzite and lime ($CaO$), added as hydrated lime, as a bonding agent, was varied by substituting various amounts of copper oxide for the quartzite. The quartzite used in these examples analyzed about 99.5 percent $SiO_2$ with $Al_2O_3+Fe_2O_3+TiO_2$+alkalies almost all of the remainder. The copper oxide was added as technical grade chemicals as supplied by Fisher Scientific Company and was all minus 100 Tyler mesh. The batch components and the data obtained on the resulting brick are:

TABLE I

| | 1 | 2 | 3 | 4 | 5 |
|---|---|---|---|---|---|
| Quartzite | 96.5 | 96.0 | 95.5 | 93.5 | 91.5 |
| Hydrated lime | 3.5 | 3.5 | 3.5 | 3.5 | 3.5 |
| Cuprous oxide ($Cu_2O$) | ------- | 0.5 | 1.0 | 3.0 | 5.0 |
| Modulus of rupture, p.s.i. | 690 | 860 | 1,090 | 1,110 | 1,210 |
| Density, lbs./ft.$^3$ | 112 | 114 | 115 | 118 | 119 |
| Apparent porosity, percent | 23.0 | 21.8 | 21.2 | 20.2 | 20.0 |
| Abrasion loss (cc. abraded after 4 min. sand blast) | 4.64 | ------- | 3.25 | 3.15 | 2.85 |

SILICA SPALLING TEST (SEVERITY OF CRACKING WHEN HEATED TO 1500° F. AT A GIVEN RATE)

| | | | |
|---|---|---|---|
| 300° F./hr. heating rate | Considerable | Very slight | None. |
| 500° F./hr. heating rate | Severe | Considerable | None. |

Thermal conductivity measurements on mixes containing the additions of cuprous oxide were also taken and these data are provided in FIG. 1.

It can be observed that the addition of cuprous oxide improved each of the properties tested. The strength of the brick, as evidenced by modulus of rupture, was greatly improved. It is well known in the refractory art that the strength of refractory bodies bears a fairly direct relation to abrasion resistance. Modulus of rupture is a standard test in refractory studies. It is determined with simple apparatus, exhibits a good degree of precision, and gives an excellent measure of bonding strength.

Therefore, its determination is often made in lieu of abrasion testing which requires much more elaborate equipment. Our experience has confirmed this relation of transverse strength to abrasion resistance and we prefer to rely upon the results learned through modulus of rupture measurements to indicate the degree of abrasion resistance, due to the excellent reproducibility of the modulus of rupture test. Hence, our experience has shown that where the strength of silica brick increases, its resistance to abrasion is improved and, because modulus of rupture is a standard test which is recognized for its precision, we prefer to construe an empirical degree of abrasion resistance from this test. Thus, in the present instance, the increase in strength shown in Examples 2, 3, 4 and 5 is representative of a great improvement in abrasion resistance. This conclusion is directly confirmed by the actual data indicated on the abrasion loss test.

The strength of superduty silica brick has always been a problem for the refractories manufacturer. Much work has been done in past years to develop stronger bonds without seriously affecting the inherent properties of brick. A modulus of rupture of less than 600 p.s.i. is very likely to result in broken corners and edges during handling and shipping. Example 1 is illustrative of the problem encountered in the production of conventional superduty brick. Small variations in batching, sizing, mixing, or pressing can result in brick which are too weak to be used satisfactorily. The also two-fold increase in strength provided by the addition of 5% cuprous oxide was unexpected and has not been fully explained. Mineralogical studies of the burned brick have indicated that the copper oxide promotes the formation of tridymite, some of which is present in the form of large crystals. It has been hypothesized that the growth of the large grains of tridymite is the cause of the added strength. Nevertheless, the increased strength imparted by the copper oxide is of real value in assuring usable brick.

The beneficial effect on resistance to thermal spalling by the addition of cuprous oxide is also apparent from the above table. Silica brick must be heated slowly up to about 1500° F. because most of their thermal expansion occurs below this temperature and they are extremely susceptible to spalling below this figure. It can be observed that Example 5 showed no cracking when heated at 500° F./hour whereas the conventional superduty brick is rendered useless by such treatment.

The increase in thermal conductivity resulting from the addition of cuprous oxide is plainly apparent from the curves in FIG. 1. The actual results are listed below:

| | Mean temp., ° F. | Thermal conductivity |
|---|---|---|
| Example 1 | 261 | 7.5 |
| | 739 | 8.7 |
| | 1,101 | 9.7 |
| | 1,579 | 10.8 |
| | 1,938 | 11.7 |
| Example 3 | 280 | 7.8 |
| | 618 | 9.1 |
| | 1,121 | 10.0 |
| | 1,561 | 11.0 |
| | 1,918 | 12.1 |
| Example 5 | 298 | 8.5 |
| | 519 | 9.7 |
| | 1,120 | 10.8 |
| | 1,541 | 12.0 |
| | 1,959 | 13.2 |

The addition of 5% cuprous oxide gave about a 10% increase in thermal conductivity to the brick.

As can be seen from the foregoing, the addition of cuprous oxide to super-duty silica brick provides brick having increased resistance to abrasion, increased resistance to thermal shock, and greater thermal conductivity. However, additions of cuprous oxide have a somewhat deleterious effect on the refractoriness of the brick and, therefore, more than 5% cannot be safely tolerated.

This favorable effect on the properties of silica brick has also been observed when copper oxide is added to conventional coke oven brick. The following examples were made in accordance with the procedure outlined above for superduty silica brick. The standard coke oven brick generally has a higher alumina and iron oxide content than superduty silica brick, in order to provide higher strength. This higher strength is particularly necessary in permitting safe handling and shipping of special coke oven shapes thus reducing breakage in transit. This higher alumina and iron oxide content is obtained by adding minor amounts of clay and iron ore, or iron oxide, usually as minus 150 mesh material, or by using less pure quartzites containing iron oxide and alumina. The batch components and data on the resulting brick are:

TABLE II

| | 6 | 7 | 8 | 9 |
|---|---|---|---|---|
| Quartzite, percent | 95.2 | 94.2 | 92.2 | 90.2 |
| Hydrated lime | 2.5 | 2.5 | 2.5 | 2.5 |
| Clay | 2.0 | 2.0 | 2.0 | 2.0 |
| Hematite | 0.3 | 0.3 | 0.3 | 0.3 |
| Cupric Oxide (CuO) | ---------- | 1.0 | 3.0 | 5.0 |
| Modulus of rupture, p.s.i. | 850 | 1,060 | 1,280 | 1,440 |
| Density, lbs./ft.$^3$ | 107 | 110 | 112 | 114 |
| Apparent porosity | 23.8 | 21.5 | 20.6 | 20.1 |

SILICA SPALLING TEST (SEVERITY OF CRACKING WHEN HEATED TO 1500° F. AT A GIVEN RATE)

| | | | | |
|---|---|---|---|---|
| 700° F./hr | Very slight. | None | None | None. |
| 800° F./hr | Moderate. | Slight | None | None. |

From the above table, it can again be seen that the addition of copper oxide (CuO) improved each of the properties tested. The strength of the brick and, therefore, the abrasion resistance was greatly increased as is evidenced by the great rise in the modulus of rupture in Examples 7, 8 and 9. Although the added alumina is beneficial in improving spalling resistance, the addition of cupric oxide gave further improvement.

The increase in thermal conductivity is apparent in the curves in FIG. 2. The actual values are listed below:

| | Mean temp., ° F. | Thermal conductivity |
|---|---|---|
| Example 6 | 332 | 7.1 |
| | 734 | 8.2 |
| | 1,138 | 9.2 |
| | 1,558 | 10.2 |
| | 1,985 | 11.4 |
| Example 7 | 327 | 7.4 |
| | 742 | 8.5 |
| | 1,168 | 9.6 |
| | 1,577 | 10.5 |
| | 1,977 | 11.5 |
| Example 9 | 340 | 7.8 |
| | 753 | 9.0 |
| | 1,164 | 10.1 |
| | 1,581 | 11.0 |
| | 1,998 | 12.0 |

As in the case of the superduty silica brick, the addition of 5 percent copper oxide increased thermal conductivity about 10 percent. However, additions of cupric oxide above about 5 percent are not practical as here, again, the refractoriness of the brick is reduced too close to the operating temperature of the coke ovens.

From the foregoing data and description, it is evident that, in consequence of our invention, improved structures can be provided for the metallurgical arts. For example, our invention provides improved by-product coke ovens having as a lining of at least the side walls thereof, brick conforming to the batch composition and analysis heretofore stated. The ovens can be operated more efficiently, based on fuel costs, due to the higher thermal conductivity of these brick. Furthermore, the improved resistance to thermal shock and abrasion serves to provide larger safety factors and thus allow greater latitude in operating the ovens.

In the foregoing discussion and description, all percentages are by weight unless otherwise stated. Similarly, the brick were prepared by conventional techniques and the property data obtained by tests that are standard in the refractory arts.

In accordance with the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A fired silica refractory brick formed from a batch consisting essentially, by weight, of about 1 to 5 percent total of at least one member of the group consisting of calcium oxide and magnesium oxide, 1 to 5 percent of a copper oxide and the remainder silica rock.

2. A silica brick in accordance with claim 1, said copper oxide being present in said batch in an amount within the range of about 3 to 5 percent.

3. *A fired silica brick made from a batch consisting essentially of, by weight, at least about 90 to about 95%, by weight, of silica rock, 1 to 5% total of at least one member of the group consisting of calcium oxide and magnesium oxide, 1 to 5% of a copper oxide, and the remainder being a minor amount of material selected from the group consisting essentially of clay, iron ore and iron oxide.*

References Cited in the file of this patent or the original patent

UNITED STATES PATENTS 2,351,204 Harvey et al. ---------- June 13, 1944
3,082,105 Oxborn ---------- Mar. 19, 1963

FOREIGN PATENTS 579,960 Germany ---------- July 3, 1933